(12) United States Patent
Hayakawa et al.

(10) Patent No.: US 7,679,859 B2
(45) Date of Patent: Mar. 16, 2010

(54) MAGNETIC RECORDING AND REPRODUCING APPARATUS WITH CIRCUIT BOARD ATTACHMENT DEVICE

(75) Inventors: Takako Hayakawa, Kanagawa (JP); Kouki Uefune, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 739 days.

(21) Appl. No.: 11/517,012

(22) Filed: Sep. 6, 2006

(65) Prior Publication Data

US 2007/0053109 A1 Mar. 8, 2007

(30) Foreign Application Priority Data

Sep. 6, 2005 (JP) ............................. 2005-258413

(51) Int. Cl.
*G11B 33/12* (2006.01)
(52) U.S. Cl. .................................................. 360/97.01
(58) Field of Classification Search ............. 360/97.01; 439/76.1; 361/740, 741, 736, 756, 759
See application file for complete search history.

(56) References Cited

U.S. PATENT DOCUMENTS

| | | | | | |
|---|---|---|---|---|---|
| 4,678,252 | A | * | 7/1987 | Moore | 439/62 |
| 5,088,929 | A | * | 2/1992 | Enomoto | 439/66 |
| 5,293,282 | A | * | 3/1994 | Squires et al. | 360/77.08 |
| 5,398,156 | A | * | 3/1995 | Steffes et al. | 361/679.58 |
| 5,454,157 | A | * | 10/1995 | Ananth et al. | 29/603.03 |
| 5,808,830 | A | * | 9/1998 | Stefansky et al. | 360/97.01 |
| 6,295,210 | B1 | * | 9/2001 | Lanzone et al. | 361/799 |
| 6,424,540 | B1 | * | 7/2002 | Chen et al. | 361/759 |
| 6,428,352 | B1 | * | 8/2002 | Boyden | 439/545 |
| 6,544,063 | B2 | * | 4/2003 | Cadio | 439/327 |
| 6,785,146 | B2 | * | 8/2004 | Koike et al. | 361/759 |
| 7,040,905 | B1 | * | 5/2006 | Wang | 439/76.1 |
| 7,364,437 | B2 | * | 4/2008 | Xu et al. | 439/76.1 |
| 7,462,055 | B2 | * | 12/2008 | Kuo et al. | 439/330 |
| 2003/0147204 | A1 | * | 8/2003 | Koike et al. | 361/600 |
| 2003/0147228 | A1 | * | 8/2003 | Koike et al. | 361/801 |
| 2004/0160749 | A1 | * | 8/2004 | Sun et al. | 361/759 |
| 2007/0032103 | A1 | * | 2/2007 | Xu et al. | 439/76.1 |

FOREIGN PATENT DOCUMENTS

| | | | | |
|---|---|---|---|---|
| DE | 4111912 | A1 | * | 10/1992 |
| JP | 02306699 | A | * | 12/1990 |
| JP | 08-007556 | | | 1/1996 |
| JP | 11068351 | A | * | 3/1999 |
| JP | 2001028489 | A | * | 1/2001 |

* cited by examiner

*Primary Examiner*—William J Klimowicz
(74) *Attorney, Agent, or Firm*—Townsend and Townsend and Crew LLP; Patrick Duncan

(57) ABSTRACT

Embodiments of the invention provide a magnetic recording and reproducing apparatus that allows a mounting space for an electric signal wiring to be sufficiently secured relative to a circuit board and the circuit board to be secured stably to the case. In one embodiment, a case having a built-in head disk assembly includes board fixing bodies disposed in a protruding condition at two of four corners thereof. Protruding ends of the board fixing bodies include fit grooves. A circuit board for drivingly controlling the head disk assembly is fitted into the fit grooves in the board fixing bodies.

20 Claims, 8 Drawing Sheets

MAGNETIC RECORDING AND REPRODUCING APPARATUS WITH CIRCUIT BOARD ATTACHMENT DEVICE

CROSS-REFERENCES TO RELATED APPLICATIONS

This application claims priority from Japanese Patent Application No. JP2005-258413, filed Sep. 6, 2005, the entire disclosure of which is incorporated herein by reference.

BACKGROUND OF THE INVENTION

The present invention relates to a magnetic recording and reproducing apparatus, such as a disk drive.

Magnetic recording and reproducing apparatuses are used in a wide range of fields. Particularly noteworthy in recent years has been the use of compact magnetic recording and reproducing apparatuses mounted on portable music players, compact mobile equipment, and the like.

The magnetic recording and reproducing apparatus of this kind has a box-like case. The case has a magnetic recording medium and a head disk assembly (HDA) that may include a magnetic head for recording or reproducing data to or from the magnetic recording medium built therein. The case is also mounted integrally with a circuit board that is disposed on an outside thereof and drivingly controls the HDA.

Further and further reduction in size is being lately promoted in equipment, in which the magnetic recording and reproducing apparatus of this kind is mounted, in order to enhance portability and the like. There is accordingly an increased need for further reduction in size also with the magnetic recording and reproducing apparatus.

In prior magnetic recording and reproducing apparatus, however, the circuit board is secured to the case using a plurality of screws. An attempt to form a compact magnetic recording and reproducing apparatus therefore presents the following problem.

Specifically, adopting the arrangement, in which the circuit board is screwed to the case, defies mounting of an electric signal wiring in spaces occupied by threaded holes into which screws are inserted of all spaces available on the circuit board. Moreover, of the spaces available on the circuit board, portions in contact with screw heads are glands and thus also defy mounting of the electric signal wiring.

More specifically, there is a reduction in spaces available for mounting the electric signal wiring on the circuit board by the amount equivalent to the space for threaded holes and the portion in contact with screw heads. It then becomes difficult to make the circuit board more compact. In particular, in a magnetic recording and reproducing apparatus built compactly to a size of 1 inch or smaller, the ratio of the area of openings of threaded holes occupying the circuit board becomes great. This helps make the aforementioned problem to be even more conspicuous.

To solve this problem, a proposed magnetic recording and reproducing apparatus includes a lock tab disposed on a peripheral edge of the circuit board. The lock tab extends toward a side face of the case. The lock tab is hooked onto a thick wall portion provided in a protruding condition on the side face of the case. The magnetic recording and reproducing apparatus thereby allows the circuit board to be secured to the case without using any screw. See, for example, Patent Document 1 (Japanese Patent Laid-open No. Hei 8-7556 (paragraphs 0040 through 0043, FIG. 4).

BRIEF SUMMARY OF THE INVENTION

In the magnetic recording and reproducing apparatus disclosed in Patent Document 1, however, the circuit board is secured to the case by simply hooking the lock tab disposed on the circuit board onto the thick wall portion of the case. Because of a weak coupling force involved of the lock tab connecting the circuit board and the case, the circuit board cannot be secured in position sufficiently stably. In particular, if an external vibration, impact, or the like is applied to the magnetic recording and reproducing apparatus, a problem is likely to arise, in which the lock tab will come off the thick wall portion of the case, causing the circuit board to fall off the case.

The present invention addresses these and other problems. It is therefore a feature of the present invention to provide a magnetic recording and reproducing apparatus that allows the mounting space for the electric signal wiring to be sufficiently secured relative to the circuit board even in a reduced size of the apparatus. The apparatus is also adapted to allow the circuit board to be secured rigidly stably to the case, thereby enhancing performance, reliability, and the like.

An aspect of the present invention provides a magnetic recording and reproducing apparatus comprising a case, a circuit board, and a circuit board fixing portion. Specifically, the case has a built-in head disk assembly for recording or reproducing data to or from a magnetic recording medium. The circuit board is disposed on an outside of the case. The circuit board drivingly controls the head disk assembly. The circuit board fixing portion is disposed on the case in a protruding condition. The circuit board fixing portion includes a fit groove disposed in a protruding end thereof. The circuit board is secured to the circuit board fixing portion by fitting an outer peripheral end of the circuit board into the fit groove in the circuit board fixing portion.

DETAILED DESCRIPTION OF THE INVENTION

Figure 1:
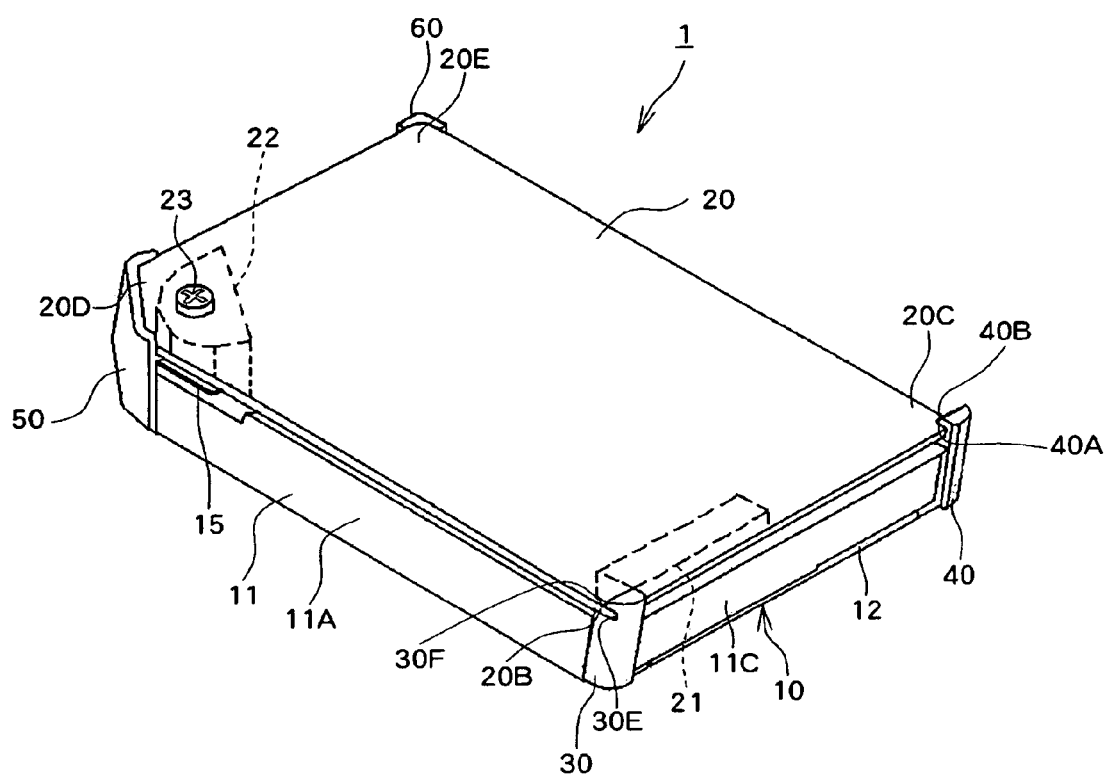
FIG. 1 is a perspective view showing a magnetic recording and reproducing apparatus according to an embodiment of the present invention.
Figure 2:
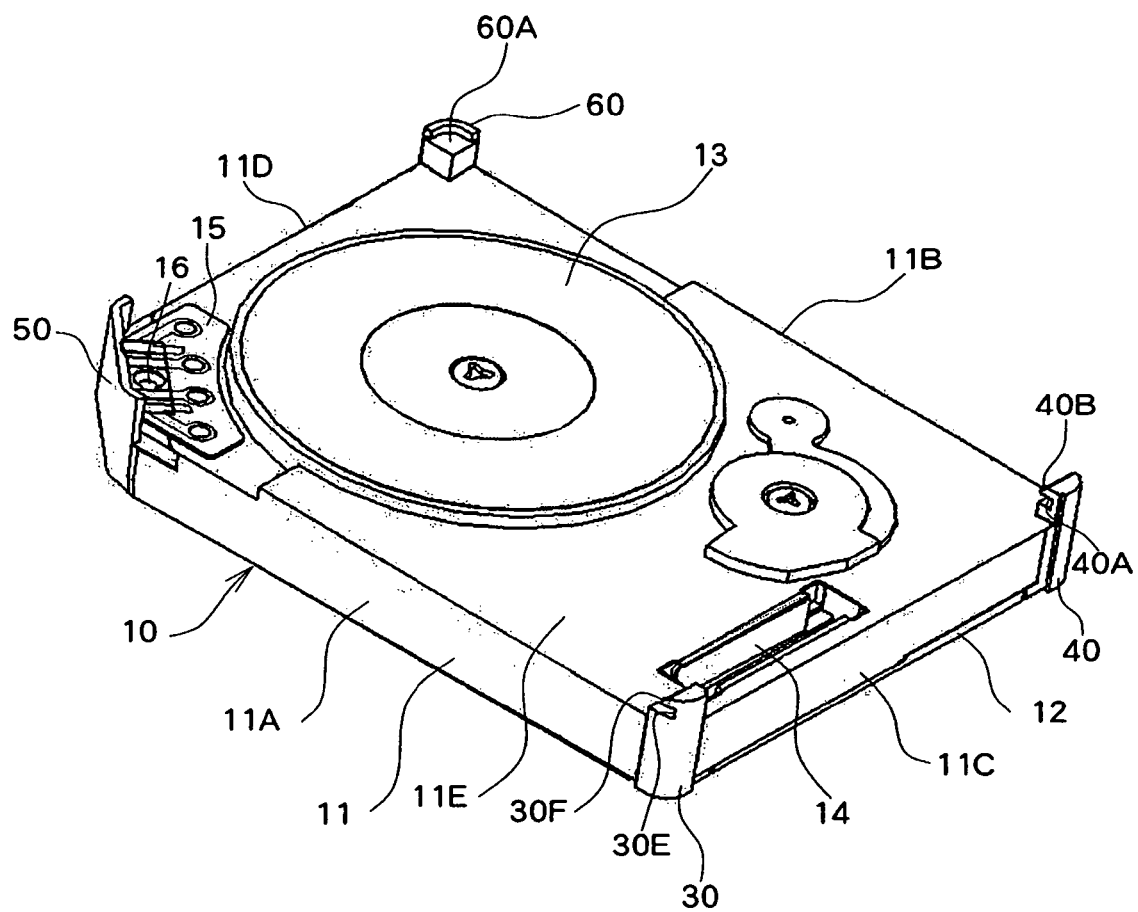
FIG. 2 is a perspective view showing the magnetic recording and reproducing apparatus of FIG. 1 with a circuit board removed.

A specific embodiment to which the present invention is applied will be described below with reference to the accompanying drawings. A magnetic recording and reproducing apparatus 1 according to the embodiment of the present invention is typically a hard disk drive (HDD). Referring to FIGS. 1 and 2, the apparatus 1 includes a case 10, a circuit board 20, and two board fixing bodies 30, 40. The board fixing bodies 30, 40 correspond in Claims to the "circuit board fixing portion."

Figure 4:
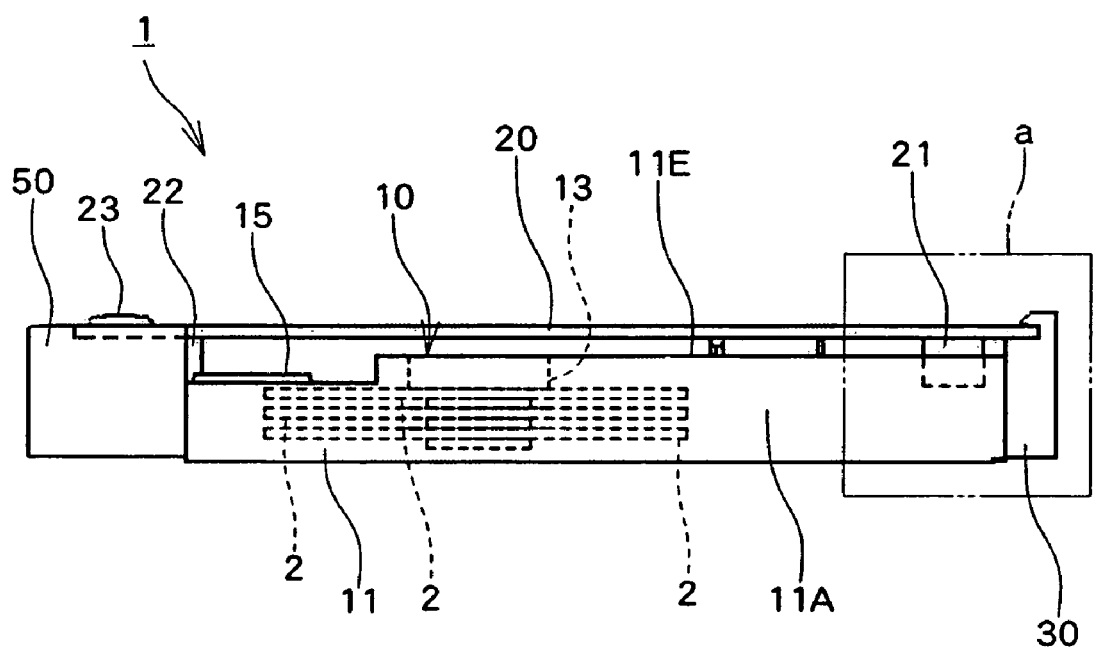
FIG. 4 is a side elevational view showing the magnetic recording and reproducing apparatus according to the embodiment of the present invention.

The case 10 is formed of a metallic material, such as an iron plate, as shown in FIGS. 1 and 2. The case 10 includes a case main body 11 and a top cover 12. The case main body 11 is a lidded rectangular tube having an open end side (the lower end side in FIG. 2) and a closed end side (the upper end side in FIG. 2). The top cover 12 closes the open end side of the case main body 11. A plurality of magnetic recording disks 2, 2, . . . (see FIG. 4) or the like as the magnetic recording medium are accommodated in the case 10. In the case 10, the magnetic recording disks 2, 2, . . . run substantially in parallel with the top cover 12 and a closing plate portion 11E of the case main body 11 to be described later.

The case 10 is shaped substantially like a rectangular parallelepiped having a thinner dimension in a thickness direction of the magnetic recording disk 2. The case 10 has a spindle motor 13 (see FIGS. 2 and 4), a magnetic head (not shown), and the like built therein with the magnetic recording disks 2. The spindle motor 13 rotatably drives the magnetic recording disks 2. The magnetic head writes or reads data to or from the magnetic recording disks 2. The magnetic recording disks 2, the spindle motor 13, and the magnetic head form what is called the "head disk assembly."

The case main body 11 includes a first side plate portion 11A, a second side plate portion 11B, a third side plate portion 11C, a fourth side plate portion 11D, and the closing plate portion 11E formed integrally with each of the side plate portions 11A to 11D.

Referring to FIG. 2, the closing plate portion 11E of the case main body 11 includes a connector insertion slot 14 formed therein. The connector insertion slot 14 is a rectangular slot disposed on the side of the first side plate portion 11A and the side of the third side plate portion 11C. The case main body 11 includes a connector terminal (not shown) disposed on an inside thereof. The connector terminal is disposed at a position corresponding to the connector insertion slot 14, serving as a receptacle into which a connector 21 to be described later is plugged.

Referring again to FIG. 2, the closing plate portion 11E of the case main body 11 includes a connection plate 15 fixedly mounted thereon through bonding or the like. The connection plate 15 is disposed at a corner of the closing plate portion 11E formed between the first side plate portion 11A and the fourth side plate portion 11D. A pressure connector 22 for motor power supply to be described later is to be pressed up against the connection plate 15. The connection plate 15 and the closing plate portion 11E of the case main body 11 include a threaded hole 16 formed therein. A screw 23 to be described later is to be screwed into this threaded hole 16. The threaded hole 16 may typically be formed as follows. Specifically, a starting hole for a self-tapping screw is drilled in advance in the connection plate 15 and the closing plate portion 11E of the case main body 11. The screw 23 is then tightened into this starting hole to form the threaded hole 16.

Figure 3:
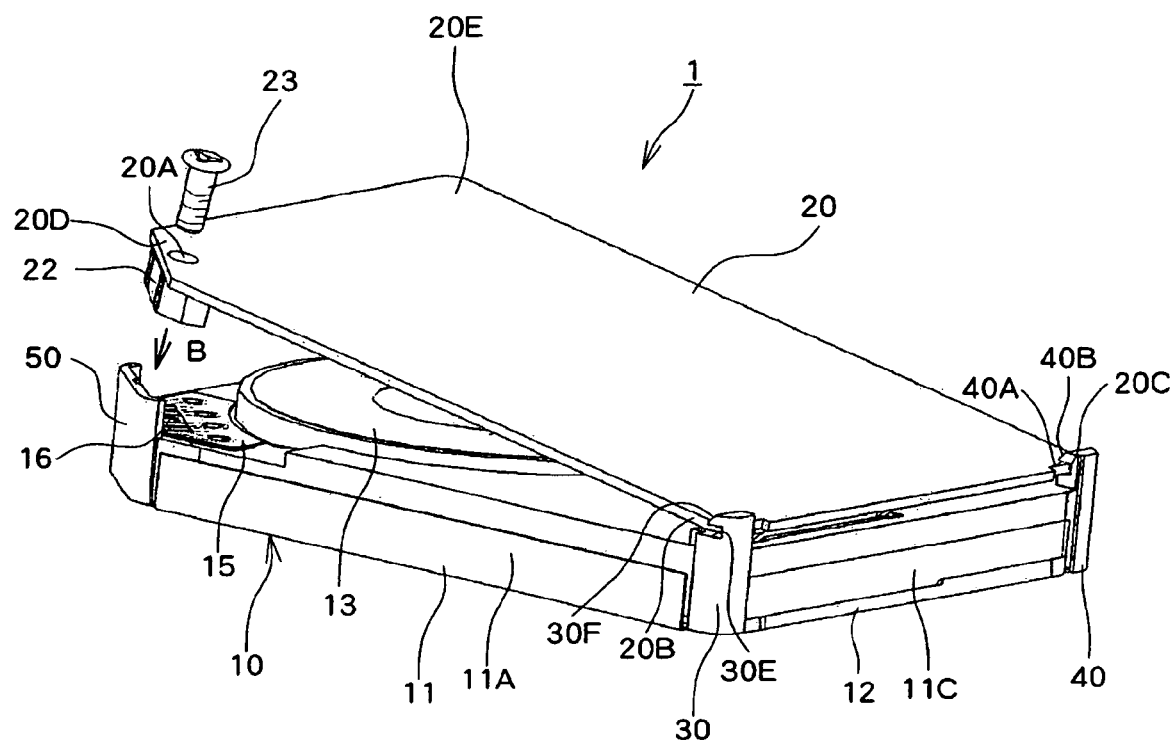
FIG. 3 is a view for illustrating a procedure for mounting the circuit board of the magnetic recording and reproducing apparatus according to the embodiment of the present invention to board fixing bodies.
Figure 5:
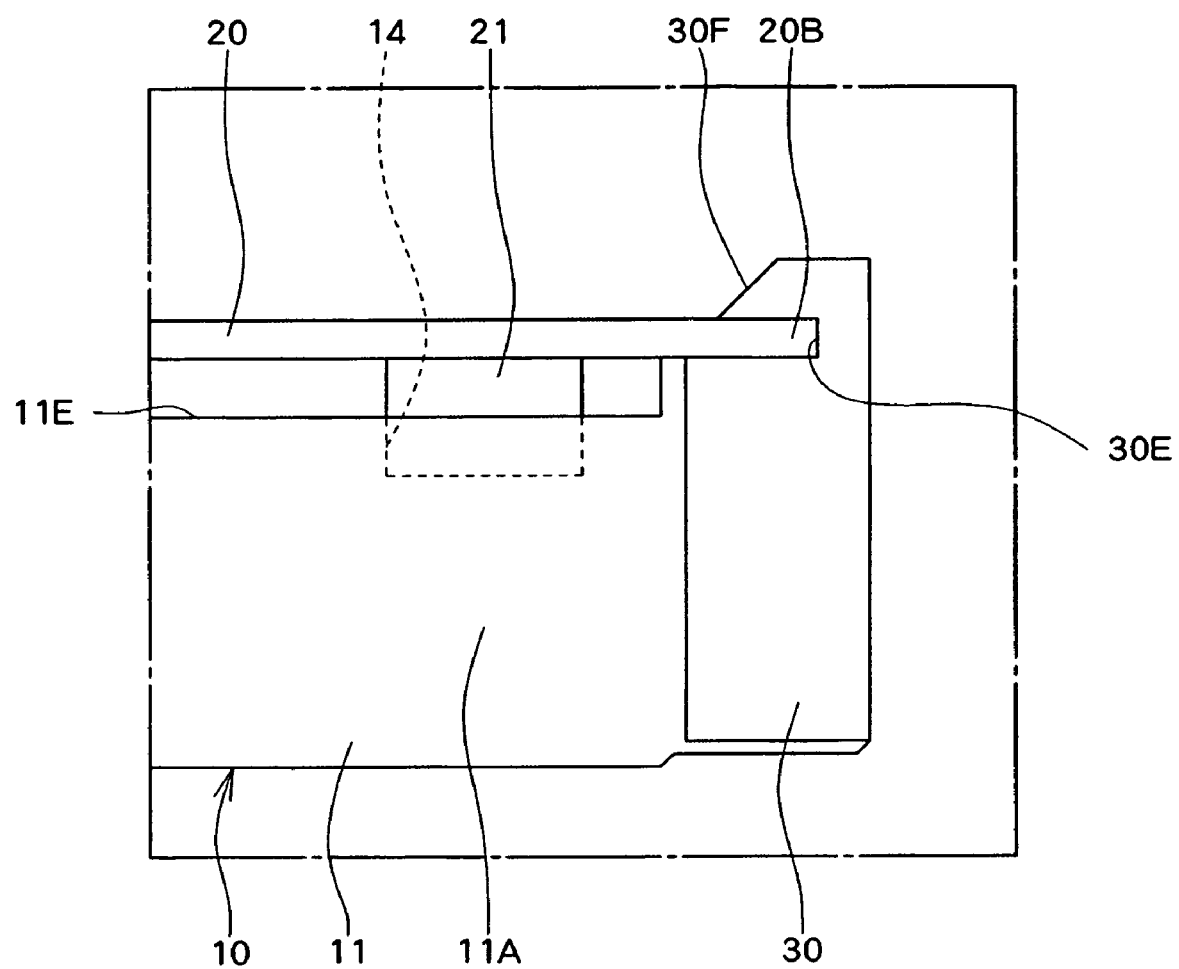
FIG. 5 is an enlarged view showing part a of FIG. 4.

Referring to FIGS. 1, 3, and 5, the circuit board 20 is formed as a flat sheet having a substantially rectangular shape. The circuit board 20 is disposed on an outside of the case 10, running substantially in parallel with the closing plate portion 11E. Mounted on a surface of the circuit board 20 opposing the closing plate portion 11E is an electric signal wiring (not shown) for drivingly controlling the head disk assembly including the spindle motor 13, the magnetic head, and the like built into the case 10. The circuit board 20 also includes a through hole 20A drilled therein as shown in FIG. 3. The through hole 20A is disposed at a corner of the circuit board 20 corresponding to the threaded hole 16.

Figure 6:
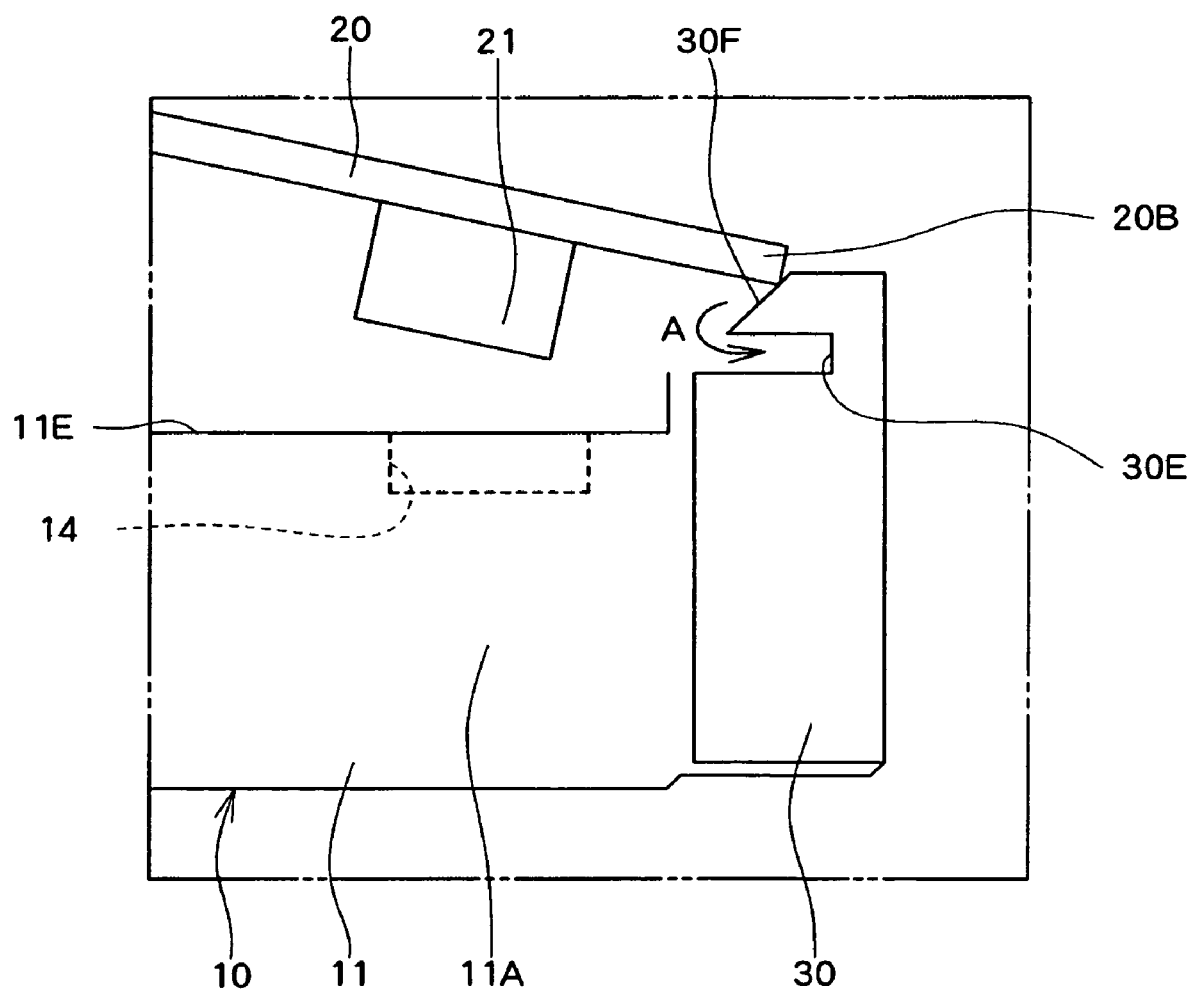
FIG. 6 is an enlarged view showing a condition, in which the circuit board is engaged with a taper of the board fixing body shown in FIG. 5.

Referring to FIGS. 1, 5, and 6, the circuit board 20 includes the connector 21 provided thereon in a protruding condition. Connecting the connector 21 to the connection terminal via the connector insertion slot 14 allows an electric signal from the magnetic head to be applied to the electric signal wiring of the circuit board 20 via the connector 21, or vice versa. This accomplishes recording or reproducing data to or from the magnetic recording disk 2.

Referring to FIGS. 1 and 3, the circuit board 20 further includes the pressure connector 22 for motor power supply provided thereon in a protruding condition. The pressure connector 22 makes tight contact with a surface of the connection plate 15 with a predetermined pressure when the screw 23 is screwed into the threaded hole 16 via the through hole 20A in the circuit board 20. This establishes an electric connection between the pressure connector 22 and the connection plate 15, allowing power to be supplied to the spindle motor 13, which rotatably drives the spindle motor 13.

The board fixing bodies 30, 40 will be next described below.

The board fixing bodies 30, 40 are typically disposed at two of all four corners of the case 10, each being apart from each other.

Figure 7:
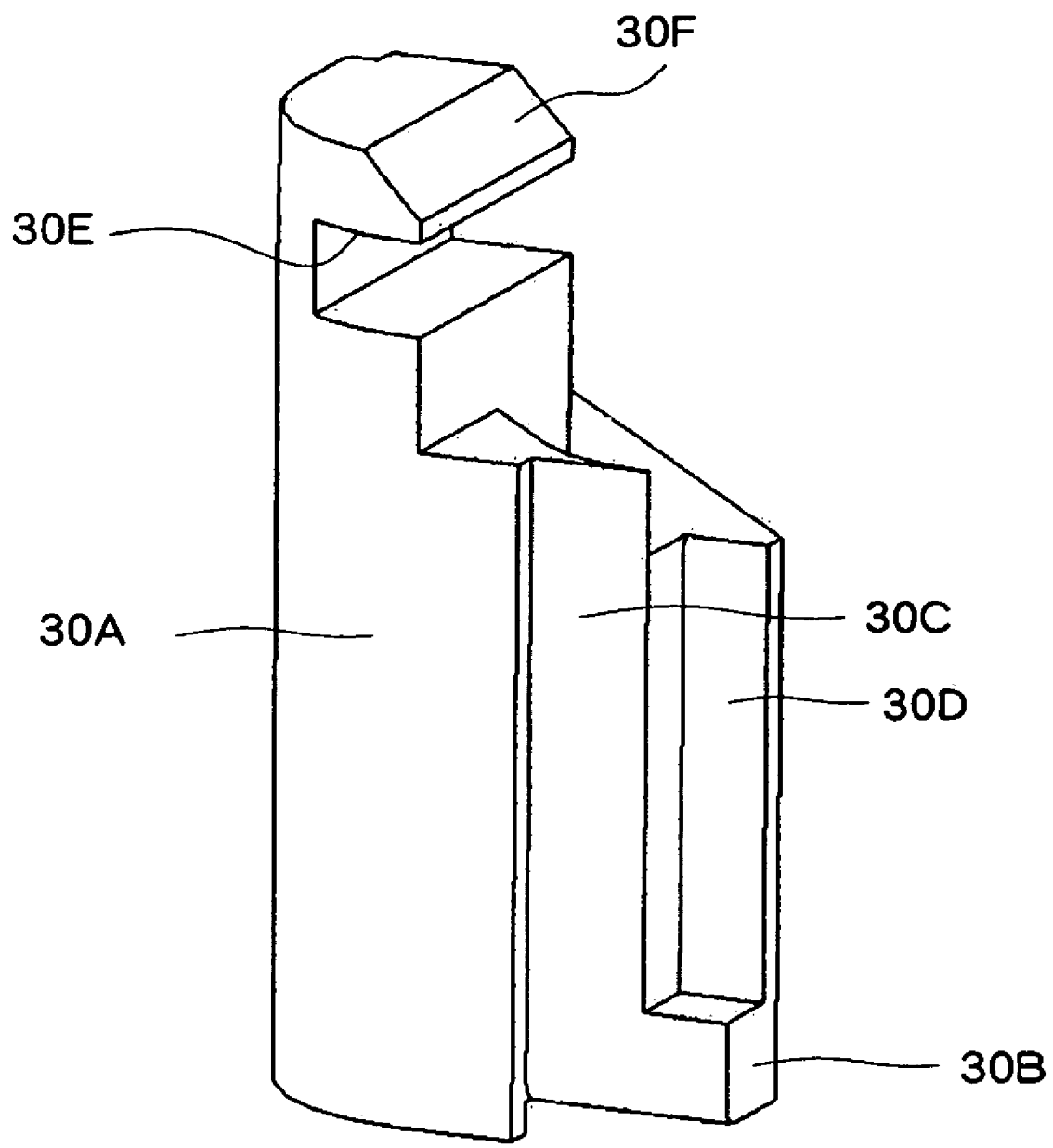
FIG. 7 is a perspective view showing a single board fixing body of the magnetic recording and reproducing apparatus according to the embodiment of the present invention.

The board fixing body 30 is formed of a resin material having elasticity, such as, for example, urethane rubber. Referring to FIG. 7, the board fixing body 30 includes a cylindrical portion 30A and a mounting portion 30B. The mounting portion 30B protrudes from a side of a proximal end in a longitudinal direction of the cylindrical portion 30A in a direction perpendicular to the longitudinal direction. The mounting portion 30B includes two shouldered portions 30C, 30D formed on the side of a protruding end thereof.

The mounting portion 30B of the board fixing body 30 is fitted in a recessed groove (not shown) formed at the corner between the first side plate portion 11A and the third side plate portion 11C of the case main body 11 in an elastically deformed state. This results in the mounting portion 30B of the board fixing portion 30 being secured in the recessed groove in a locked state. The mounting portion 30B may still be fixed in the recessed groove through bonding or the like so as to enhance a mounting strength of the mounting portion 30B with respect to the recessed groove even further. The board fixing body 30 is disposed near the connector insertion slot 14 formed in the case main body 11.

A distal end of the cylindrical portion 30A of the board fixing body 30 in the longitudinal direction thereof protrudes from the case main body 11 toward the circuit board 20. The protruding end side includes a fit groove 30E formed by a substantially C-shaped recessed groove. A corner 20B (see FIGS. 1 and 3) on the side of an outer peripheral end of the circuit board 20 is fitted in the fit groove 30E in the board fixing body 30 in a locked state because of an elastic restoring force of the board fixing body 30. In addition, the cylindrical portion 30A includes a taper 30F disposed on the protruding end side thereof. The taper 30F is formed by a slope surface inclined obliquely. The taper 30F functions to guide the circuit board 20 smoothly into the fit groove 30E in the direction of arrow A in FIG. 6 when it is attempted to fit the circuit board 20 into the fit groove 30E. This smooth guiding of the circuit board 20 into the fit groove 30E is accomplished by allowing the corner 20B to be engaged with and slid along the taper 30F.

Referring again to FIGS. 1 and 3, the board fixing body 40 is constructed in substantially the same manner as the board fixing body 30. The board fixing body 40 includes a fit groove 40A, a taper 40B, a mounting portion (not shown), and the like. The board fixing body 40 is mounted integrally at the corner between the second side plate portion 11B and the third side plate portion 11C of the case main body 11. The board fixing body 40 is disposed near the connector insertion slot 14 like the board fixing body 30. A corner 20C on the side of an outer peripheral end of the circuit board 20 is fitted in the fit groove 40A in the board fixing body 40 in a locked state because of an elastic restoring force involved of the board fixing body 40.

Referring to FIGS. 1 and 2, a positioning plate 50 made typically of a resin material having elasticity is disposed in a protruding condition at the corner between the first side plate portion 11A and the fourth side plate portion 11D of the case main body 11. The positioning plate 50 serves as a bracket with which a corner 20D of the circuit board 20 is engaged when the circuit board 20 is mounted, thereby allowing the circuit board 20 to be positioned correctly relative to the case 10.

A positioning tab 60 formed of a resin material having elasticity is disposed in a protruding condition at the corner between the second side plate portion 11B and the fourth side plate portion 11D of the case main body 11. The positioning tab 60 has a cutout groove 60A formed on its protruding end. A corner 20E of the circuit board 20 is fitted into the cutout groove 60A when the circuit board 20 is mounted. The positioning tab 60 thereby correctly positions the circuit board 20 together with the positioning plate 50 relative to the case 10.

Mounting of the circuit board 20 will be described below.

First, engage the comers 20B, 20C (only the corner 20B is shown in FIG. 6) with the tapers 30F, 40B of the board fixing bodies 30, 40, respectively, with the circuit board 20 held in an inclined position as shown in FIG. 6. Second, let the corners 20B, 20C of the circuit board 20 slide obliquely downwardly along the tapers 30F, 40B so that the connector 21 is inserted in the connector insertion slot 14. This results in the comers 20B, 20C of the circuit board 20 being smoothly guided in the direction of arrow A in FIG. 6 toward the fit grooves 30E, 40A and eventually fitted into the fit grooves 30E, 40A, respectively (see FIG. 3).

Next, in this condition, lower the circuit board 20 downwardly in the direction of arrow B shown in FIG. 3 so that the pressure connector 22 contacts the connection plate 15 and the connector 21 connects to the connection terminal in the case 10.

At this time, the corner 20D of the circuit board 20 is engaged with the positioning plate 50 and the corner 20E of the circuit board 20 is fitted in the cutout groove 60A in the positioning tab 60. This positions correctly the circuit board 20 relative to the case 10, thus automatically aligning the through hole 20A with the threaded hole 16. As a final step, secure the circuit board 20 to the case 10 using the screw 23.

As described in detail in the foregoing, the magnetic recording and reproducing apparatus 1 according to the embodiment of the present invention has the arrangement, in which the comers 20B, 20C disposed on the proximal end in the longitudinal direction of the circuit board 20 are fitted into the fit grooves 30E, 40A in the board fixing bodies 30, 40 provided on the case 10 in the protruding condition.

This allows the circuit board 20 to be held in position by being clamped rigidly from both sides thereof by the fit grooves 30E, 40A in the board fixing bodies 30, 40. This enhances a coupling force (mounting strength) of the circuit board 20 with respect to the board fixing bodies 30, 40.

Accordingly, even if vibration, impact, or the like is applied externally to the apparatus 1, the circuit board 20 can be prevented from coming off from the board fixing bodies 30, 40. The circuit board 20 can thereby be secured stably to the board fixing bodies 30, 40, which helps enhance performance, reliability, and the like of the apparatus 1.

The arrangement, in which the proximal end in the longitudinal direction of the circuit board 20 is secured with the board fixing bodies 30, 40, eliminates the need for providing a threaded hole and a screw as they are found on the proximal end in the prior art apparatus. This secures a sufficient space for mounting the electric signal wiring with respect to the circuit board 20. Reduction in size of the apparatus 1 can thus further be promoted.

Figure 8:
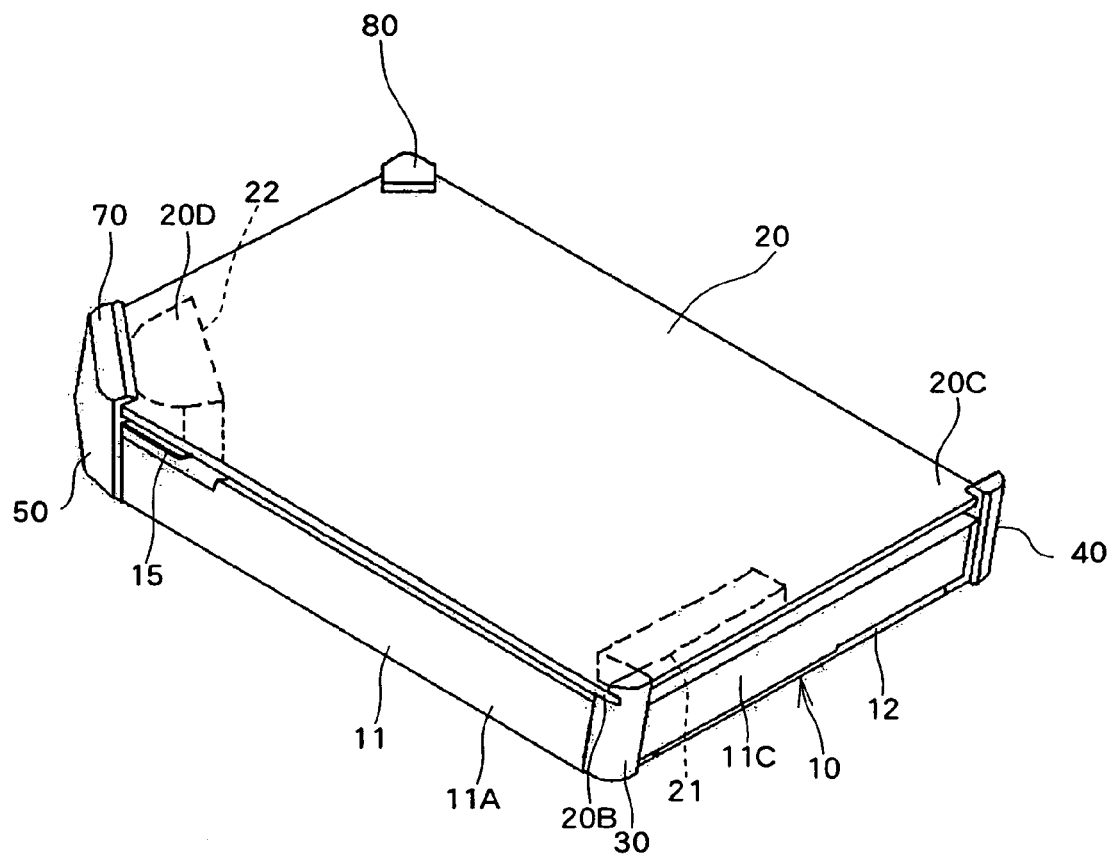
FIG. 8 is a perspective view showing a magnetic recording and reproducing apparatus according to a modified example of the present invention.

The embodiment of the present invention has been described with reference to an exemplary arrangement, in which the circuit board 20 is secured using two board fixing bodies 30, 40 and one screw 23. The present invention is not limited to this arrangement and can be implemented in a variety of other manners. For example, as illustrated in a modified example shown in FIG. 8, the screw 23 is not used and the case 10 is adapted to include board fixing bodies 30, 40, 70, 80 disposed in a protruding condition at corresponding four comers thereof, with which the circuit board 20 is secured. Alternatively, it is also appropriate that the board fixing body be provided in the protruding condition at each of three or only one of the all four corners of the case 10.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic recording and reproducing apparatus comprising:
    a case having a built-in head disk assembly for recording or reproducing data to or from a magnetic recording medium and a connection plate with a hole formed therein;
    a circuit board disposed on an outside of the case, the circuit board for drivingly controlling the head disk assembly; and
    a circuit board fixing portion disposed on the case in a protruding condition, the circuit board fixing portion including a fit groove disposed in a protruding end thereof;
    wherein the circuit board is secured to the circuit board fixing portion by fitting an outer peripheral end of the circuit board into the fit groove in the circuit board fixing portion, and
    wherein the circuit board is secured to the case by a screw through the hole of the connection plate.

2. The magnetic recording and reproducing apparatus according to claim 1,
    wherein the case is formed into a rectangular parallelepiped having a thinner dimension in a thickness direction of the magnetic recording medium and the circuit board fixing portion is disposed at least two of all four corners of the case.

3. The magnetic recording and reproducing apparatus according to claim 2,
    wherein the circuit board fixing portion is formed separately from, and mounted integrally with, the case.

4. The magnetic recording and reproducing apparatus according to claim 3,
    wherein the case is formed from a metallic material and the circuit board fixing portion is formed from a resin material.

5. The magnetic recording and reproducing apparatus according claim 4,
wherein the circuit board fixing portion includes, on the protruding end thereof, a taper for guiding the outer peripheral end of the circuit board toward the fit groove during an attempt to fit the circuit board into the fit groove.

6. The magnetic recording and reproducing apparatus according claim 3,
wherein the circuit board fixing portion includes, on the protruding end thereof, a taper for guiding the outer peripheral end of the circuit board toward the fit groove during an attempt to fit the circuit board into the fit groove.

7. The magnetic recording and reproducing apparatus according claim 2,
wherein the circuit board fixing portion includes, on the protruding end thereof, a taper for guiding the outer peripheral end of the circuit board toward the fit groove during an attempt to fit the circuit board into the fit groove.

8. The magnetic recording and reproducing apparatus according claim 1,
wherein the circuit board fixing portion includes, on the protruding end thereof, a taper for guiding the outer peripheral end of the circuit board toward the fit groove during an attempt to fit the circuit board into the fit groove.

9. The magnetic recording and reproducing apparatus according to claim 1,
wherein the circuit board includes a connector provided thereon in a protruding condition, the connector for transmitting an electric signal from the head disk assembly to the circuit board, wherein the case includes a connector insertion slot into which the connector is inserted, and wherein the circuit board fixing portion is disposed near the connector insertion slot.

10. The magnetic recording and reproducing apparatus according to claim 9,
wherein the circuit board includes a motor power supply pressure connector for supplying power to a spindle motor forming part of the head disk assembly and the circuit board is secured together with the circuit board fixing portion to the case using one screw for pressing the motor power supply pressure connector up against the case.

11. The magnetic recording and reproducing apparatus according to claim 10,
wherein the case includes a starting hole for a self-tapping screw drilled in advance therein, the starting hole serving to form a threaded hole, in which the screw is installed through screwing and which is formed by tightening the screw.

12. The magnetic recording and reproducing apparatus according to claim 1,
wherein the circuit board includes a motor power supply pressure connector for supplying power to a spindle motor forming part of the head disk assembly and the circuit board is secured together with the circuit board fixing portion to the case using one screw for pressing the motor power supply pressure connector up against the case.

13. The magnetic recording and reproducing apparatus according to claim 12,
wherein the case includes a starting hole for a self-tapping screw drilled in advance therein, the starting hole serving to form a threaded hole, in which the screw is installed through screwing and which is formed by tightening the screw.

14. A magnetic recording and reproducing apparatus comprising:
a case having a head disk assembly for recording or reproducing data to or from a magnetic recording medium and a connection plate with a hole formed therein;
a circuit board disposed on an outside of the case, the circuit board to be operatively coupled to the head disk assembly; and
a circuit board fixing portion disposed on the case in a protruding condition, the circuit board fixing portion including a fit groove disposed in a protruding end thereof;
wherein the circuit board is secured to the circuit board fixing portion by fitting an outer peripheral end of the circuit board into the fit groove in the circuit board fixing portion and
wherein the circuit board is secured to the case by a screw through the hole of the connection plate.

15. The magnetic recording and reproducing apparatus according to claim 14,
wherein the case is formed into a rectangular parallelepiped having a thinner dimension in a thickness direction of the magnetic recording medium and the circuit board fixing portion is disposed at least two of all four corners of the case.

16. The magnetic recording and reproducing apparatus according to claim 14,
wherein the circuit board fixing portion is formed separately from, and mounted integrally with, the case.

17. The magnetic recording and reproducing apparatus according claim 14,
wherein the circuit board fixing portion includes, on the protruding end thereof, a taper for guiding the outer peripheral end of the circuit board toward the fit groove during an attempt to fit the circuit board into the fit groove.

18. The magnetic recording and reproducing apparatus according to claim 14,
wherein the circuit board includes a connector provided thereon in a protruding condition, the connector for transmitting an electric signal from the head disk assembly to the circuit board, wherein the case includes a connector insertion slot into which the connector is inserted, and wherein the circuit board fixing portion is disposed adjacent the connector insertion slot.

19. The magnetic recording and reproducing apparatus according to claim 18,
wherein the circuit board includes a motor power supply pressure connector for supplying power to a spindle motor forming part of the head disk assembly and the circuit board is secured together with the circuit board fixing portion to the case using one screw for pressing the motor power supply pressure connector up against the case.

20. The magnetic recording and reproducing apparatus according to claim 19,
wherein the case includes a starting hole for a self-tapping screw drilled in advance therein, the starting hole serving to form a threaded hole, in which the screw is installed through screwing and which is formed by tightening the screw.

* * * * *